(12) United States Patent
Keen et al.

(10) Patent No.: US 11,016,276 B2
(45) Date of Patent: May 25, 2021

(54) IMAGING SYSTEM

(71) Applicant: Fugro ROAMES Pty Limited, Eight Mile Plains (AU)

(72) Inventors: Steven Robert Keen, Burbank (AU); James Gordon Bangay, Rochedale South (AU)

(73) Assignee: Fugro ROAMES Pty Limited, Eight Mile Plains (AU)

( * ) Notice: Subject to any disclaimer, the term of this patent is extended or adjusted under 35 U.S.C. 154(b) by 0 days.

(21) Appl. No.: 15/537,271

(22) PCT Filed: Dec. 18, 2015

(86) PCT No.: PCT/AU2015/050817
§ 371 (c)(1),
(2) Date: Jun. 16, 2017

(87) PCT Pub. No.: WO2016/094964
PCT Pub. Date: Jun. 23, 2016

(65) Prior Publication Data
US 2018/0003932 A1    Jan. 4, 2018

(30) Foreign Application Priority Data

Dec. 18, 2014  (AU) ............................. 2014905125

(51) Int. Cl.
*H04N 5/232* (2006.01)
*G02B 17/00* (2006.01)
(Continued)

(52) U.S. Cl.
CPC .......... *G02B 17/008* (2013.01); *G01S 3/7864* (2013.01); *G02B 7/1821* (2013.01); *G02B 7/1827* (2013.01); *G03B 15/006* (2013.01); *G03B 17/17* (2013.01); *G06K 9/3216* (2013.01); *G06T 7/001* (2013.01); *G06T 7/74* (2017.01); *H04N 5/2254* (2013.01); *H04N 5/2259* (2013.01); *H04N 5/232* (2013.01); *H04N 5/2328* (2013.01); *H04N 5/23254* (2013.01); *G06K 9/00979* (2013.01); *G06K 9/2081* (2013.01); *G06K 9/6267* (2013.01);
(Continued)

(58) Field of Classification Search
CPC .... G01S 3/7864; G02B 7/1821; G03B 15/006
USPC ... 348/208.14, 143, 116, 135, 139, 125, 117
See application file for complete search history.

(56) References Cited

U.S. PATENT DOCUMENTS 6,172,747 B1  1/2001  Houlberg
7,768,631 B1  8/2010  Rovinsky
(Continued)

OTHER PUBLICATIONS

International Search Report and Written Opinion from PCT/AU2015/050817, dated Feb. 12, 2016, 8 pages.

*Primary Examiner* — Jefferey F Harold
*Assistant Examiner* — Jean W Desir

(57) ABSTRACT

An imaging system for creating an image of a target object comprising a mirror mounted on a gimbal and arranged to rotate about at least one axis, a gimbal drive unit configured to control the orientation of the gimbal, and a camera having its optical axis directed onto the mirror in order that an image reflected in the mirror is within a field of view of the camera, wherein the control unit is arranged to position the gimbal such that a reflection of a target object is within a field of view of the camera.

9 Claims, 7 Drawing Sheets

(51) Int. Cl.
*G03B 17/17* (2021.01)
*G03B 15/00* (2021.01)
*G01S 3/786* (2006.01)
*G02B 7/182* (2021.01)
*G06T 7/73* (2017.01)
*G06K 9/32* (2006.01)
*G06T 7/00* (2017.01)
*H04N 5/225* (2006.01)
*G06K 9/00* (2006.01)
*G06K 9/20* (2006.01)
*G06K 9/62* (2006.01)
*G06T 7/20* (2017.01)

(52) U.S. Cl.
CPC ...... *G06T 7/20* (2013.01); *G06T 2207/10032* (2013.01); *H04N 2005/2255* (2013.01)

(56) References Cited

U.S. PATENT DOCUMENTS

| | | | |
|---|---|---|---|
| 2005/0007450 A1 | 1/2005 | Hill | |
| 2013/0321626 A1* | 12/2013 | Finn | G01C 11/025 348/145 |
| 2015/0221079 A1* | 8/2015 | Schultz | G06T 7/0004 382/190 |
| 2017/0322551 A1* | 11/2017 | Zang | G05D 1/0038 |

* cited by examiner

IMAGING SYSTEM

CROSS-REFERENCE TO RELATED APPLICATIONS

This application is a national stage filing of PCT International Application Serial No. PCT/AU2015/050817, filed Dec. 18, 2015, which claims the benefit of Australian Provisional Patent Application Serial No. 2014905125, filed Dec. 18, 2014, the disclosures of which are expressly incorporated by reference herein in their entireties.

The present invention relates to an imaging system.

Electricity grids include a network of overhead electricity power cables supported by power poles. The power cables are electrical conductors which carry electricity at high voltages. The power poles are made from materials including metals or wood.

The exposure of the power poles to the elements as well as general stresses and strains placed on the power poles by the electricity cables can result in degradation and damage the power poles over time. Wooden poles can develop rot or cracks and metal poles can rust or crack over time. Degradation of power poles is dangerous and can result in failure of the power pole.

Additionally, power cables and associated insulation are also exposed to elemental conditions and can become degraded, for example, by insulation cracking or breaking. Damage to the cables and installation can be dangerous.

Maintenance of power poles and cables in the electricity power network is an important consideration for electricity suppliers. Damage to poles and cables can be difficult to identify from a distance. Existing inspection procedures include engineers climbing power poles for a close visual inspection of the pole and cabling. Other inspection techniques include using helicopters to hover close to the top of the tower to allow an engineer to inspect the top of the power pole either visually or by photographing the power pole at a high resolution at close range to capture images of the power pole.

Regular and careful inspection of the condition of power poles and power cables using existing techniques is an expensive and time consuming process and requires significant resource for electricity companies. Embodiments of the present invention address these problems.

SUMMARY OF THE INVENTION

In accordance with a first aspect of the present invention there is provided an imaging system comprising a mirror arranged to rotate about at least one axis, a control unit to control the position of the mirror, and a camera having a field of view, wherein the control unit is arranged to angle the mirror to position a reflection of a target object in the field of view of the camera.

Preferably the imaging system includes a gimbal, the gimbal supporting the mirror.

Preferably the optical axis of the camera is directed at the centre of rotation of the mirror Preferably the mirror is a first surface mirror.

Preferably the camera and mirror move with respect to the target object.

Preferably the imaging system includes an image database including predefined images of target objects, and an image recognition system, wherein the image recognition system is arranged to identify a preselected one of the predefined images in the field of view of the camera.

Preferably the imaging system includes a tracking system, wherein the tracking system drives the control unit to maintain the target object in the field of view of the camera.

Preferably the imaging system is positioned in an aircraft.

Preferably the angle of the mirror is determined in dependence on at least one of:
  speed of the imaging system;
  angle of the imaging system;
  altitude of the imaging system;
  location of the imaging system;
  distance between the target object and the imaging system.

Preferably the imaging system is attached to an aircraft and the target object is a power pole.

In a second aspect the invention provides a method for capturing an image of a predetermined target object, comprising the steps of selecting a target object and arranging a mirror to position a reflection of the selected target object within a field of view of a camera.

Preferably the target object is selected from an image database including predefined images of target objects and the invention identifies the selected target object in the field of view of the camera.

Preferably the mirror is arranged in dependence on at least one of:
  speed of the imaging system;
  angle of the imaging system;
  altitude of the imaging system;
  location of the imaging system;
  distance between the target object and the imaging system.

In a third aspect the invention provides an imaging system for creating an image of a target object comprising:
  mirror mounted on a gimbal and arranged to rotate about at least one axis;
  gimbal drive unit configured to control the orientation of the gimbal;
  camera having its optical axis directed onto the mirror in order that an image reflected in the mirror is within a field of view of the camera;
  wherein the gimbal drive unit is arranged to position the gimbal such that a reflection of a target object from the mirror is within the field of view of the camera.

In an embodiment the optical axis of the camera is directed onto the centre of rotation of the mirror.

In an embodiment the mirror is a first surface mirror.

In an embodiment the camera and mirror move with respect to the target object.

Further embodiments comprise an image database including predefined images of target objects, and an image recognition system, wherein the image recognition system is arranged to identify a preselected one of the predefined images in the field of view of the camera.

Further embodiments comprise a tracking system, wherein the tracking system controls the gimbal drive unit to maintain the target object in the field of view of the camera.

In an embodiment the imaging system is positioned in an aircraft.

In an embodiment the angle of the mirror is determined in dependence on at least one of:
  speed of the imaging system;
  orientation of the imaging system;
  altitude of the imaging system;
  location of the imaging system with respect to the target object;
  distance between the target object and the imaging system.

In an embodiment the imaging system is attached to an aircraft and the target object is a power pole.

In a fourth aspect the invention provides a method for creating an image of a target object from a camera comprising the steps of:
  determining the location of a target object;
  determining the location of an imaging system, the imaging system comprising a camera arranged to capture a reflected image from a mirror;
  determining orientation data of the imaging system; and,
  positioning the mirror in order that a reflection of the target image from the mirror is located within a field of view of the camera.

In an embodiment the optical axis of the camera is directed onto the centre of rotation of the mirror.

In an embodiment the mirror is a first surface mirror.

In an embodiment the camera and mirror move with respect to the target object.

Further embodiments comprise an image database including predefined images of target objects, and an image recognition system, comprising the step of the image recognition system identifying a preselected one of the predefined images in the field of view of the camera. Further embodiments comprise a tracking system, comprising the step of controlling the gimbal drive unit to maintain the target object in the field of view of the camera.

In further embodiments the imaging system is positioned in an aircraft.

In further embodiments the angle of the mirror is determined in dependence on at least one of:
  speed of the imaging system;
  orientation of the imaging system;
  altitude of the imaging system;
  location of the imaging system with respect to the target object;
  distance between the target object and the imaging system.

In further embodiments the imaging system is attached to an aircraft and the target object is a power pole.

BRIEF DESCRIPTION OF THE DRAWINGS

The present invention will now be described, by way of example only, with reference to the accompanying drawings, in which.

DETAILED DESCRIPTION

Embodiments of the invention provide a system for capturing high resolution images of a target from distances of a few hundred metres.

Embodiments of the present invention provide an imaging system including a camera and mirror system in which the camera is configured to capture images of target objects reflected in the mirror. The mirror system is arranged to be moveable such that the angle of the mirror with respect to the camera can be adjusted in order to change the field of view of the camera. In embodiments, the position of the mirror system is controlled by a control unit. The imaging system also includes a processing system to identify the position of an image target with respect to the imaging system and to calculate the required angle of the mirror in order that the target is positioned within the field of view of the camera. Further embodiments include image recognition software to identify the target image within the field of view of the camera.

In embodiments the system is mounted in a moving vehicle, including an aircraft. The vehicle may include multiple imaging systems to capture different targets or to capture images of a single target from different angles.

Embodiments calculate the required position of the mirror based on at least one of, the location of the target object, the location of the imaging system, the angle of the imaging system, the speed of the imaging system, the speed of the target object, the distance between the imaging system and the target object.

In some embodiments of the system the mirror is mounted in a gimbal arrangement. The gimbal allows accurate control of the position of the mirror in order to correctly angle the mirror and the associated field of view. Some embodiments of the invention track the target as the system or the target moves with respect to the other. In such embodiments the control unit controls the position of the mirror in order that the target image is maintained within the field of view of the camera. Accurate positioning control of the mirror facilitates stable imaging of the target object from a moving camera providing high resolution images from long distances.

Imaging Hardware

Figure 1:
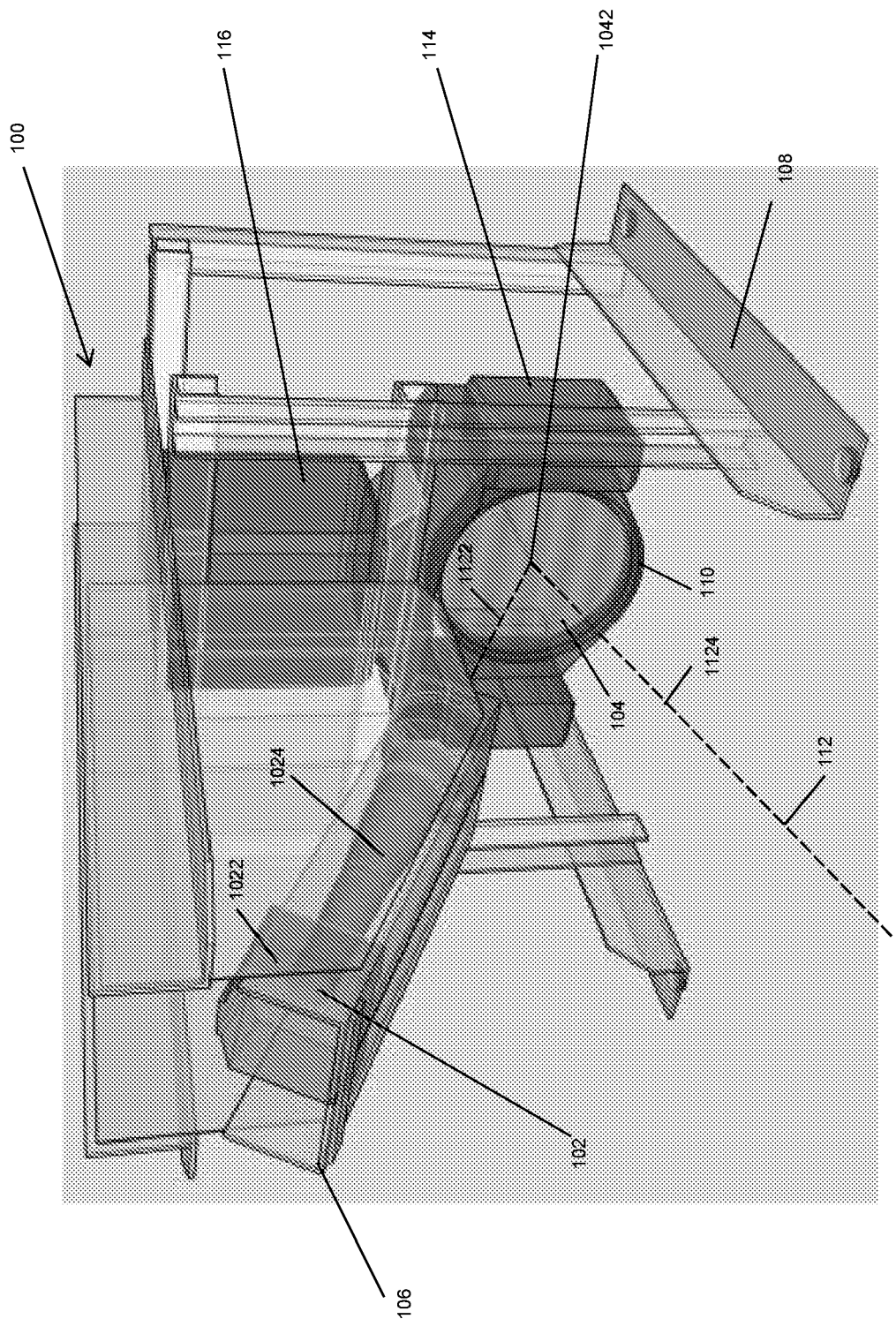
FIG. 1 is an illustration of an imaging system in accordance with an embodiment of the invention.

An embodiment of the imaging system is illustrated in FIG. 1. Imaging system 100 includes a camera 102 and mirror 104. Imaging system 100 is configured to provide high resolution images of objects at a distance of around 500 meters. Embodiments provide resolutions of a few millimetres per pixel at over 500 m. The particular configuration of imaging system 100 is designed for installation into an aircraft. Camera 102 is a high resolution Digital Single Lens Reflex (DSLR) camera 1022 having a 1200 millimetre telephoto lens 1024. In further embodiments of the invention different camera or lens systems can be used in order to provide suitable focal lengths, resolution and field of views to capture target images. Typically lenses are between 600 to 1200 mm.

Camera system 102 is attached to fixed camera support 106. The fixed camera support 106 is attached to support stand 108 which is connected to the aircraft (not shown). In embodiments the support stand is adjustable to change the angle of the camera with respect to the mirror.

Mirror 104 is circular and supported within gimbal 110 to allow tilting and rotation of mirror 104. Gimbal 110 is arranged to provide rotation of mirror 104 about axes running through the centre point 1042 of the mirror.

The camera and mirror system is arranged such that centre of rotation 1042 of mirror 104 is a constant distance from the centre of the lens of the camera system 102 for all angles of mirror 104. Dashed line 112 illustrates the optical axis of camera 102. Imaging system 100 is arranged such that optical axis 112 is aligned with the centre of rotation 1042.

The angle of the optical axis 1122 from the camera system to the mirror remains unchanged regardless of the angle of the mirror since the camera system is fixed in position. The centre of rotation 1042 of mirror 104 remains at a fixed position with respect to the camera regardless of the angle of the mirror. Consequently, the distance of path 1122 remains constant for any angle of the mirror 104. However, the angle of the reflected part of the optical axis 112, 1124, is dependent on the angle of mirror 104. On striking mirror 104, path 1124 is reflected at an angle according to the angle of incidence of 1122 to the surface of mirror 104.

By maintaining a constant distance between the camera system and the centre of rotation 1042 of mirror 104 calculations of angular positioning of the mirror in order to capture images of a target object are simplified.

Mirror Specifications

Mirror 104 is a laboratory grade first surface mirror having a flatness of four lambda. The diameter of mirror 104 is 150 millimetres and its thickness is 25 millimetres. The classification of mirror 104 is designed for a commercial imaging system to provide a high resolution at a distance or distances of around 500 metres. Different mirror classifications can be used for different applications or performance requirements.

Mirror 104 is supported within gimbal 110. As discussed above, gimbal 110 is arranged to maintain centre of rotation 1042 at a fixed point in space with respect to the system at a constant distance from a camera system 102. The position of gimbal 110 is controlled by gimbal positioner 114 which is driven by control unit 116. The mirror support system, including gimbal 110 and gimbal positioner 114 is attached to support stand 108 to avoid any movement of the mirror system with respect to the aircraft.

Stability

The angle of the mirror and stability of the camera and mirror in the imaging system are required to be accurate in order to accurately maintain focus on the target image. In order to maintain stability of the sensitive imaging apparatus the imaging system is preferably mounted inside the fuselage of the aircraft, or relevant vehicle. In some embodiments the system is mounted outside the vehicle but interference by the elements including wind resistance and rain may impact performance of the system.

Embodiments include vibration dampening systems on the imaging system to reduce blurring of images. Vibration dampening systems are applied to the frame of the imaging system to isolate the system from vibrations occurring in the vehicle. Since the camera and mirror are both attached to the frame the relative position of the mirror and camera is unchanged but the vibration system works to reduce overall vibrations in the system. Preferably passive vibration dampening system is installed.

System Control and Processing

Figure 2:
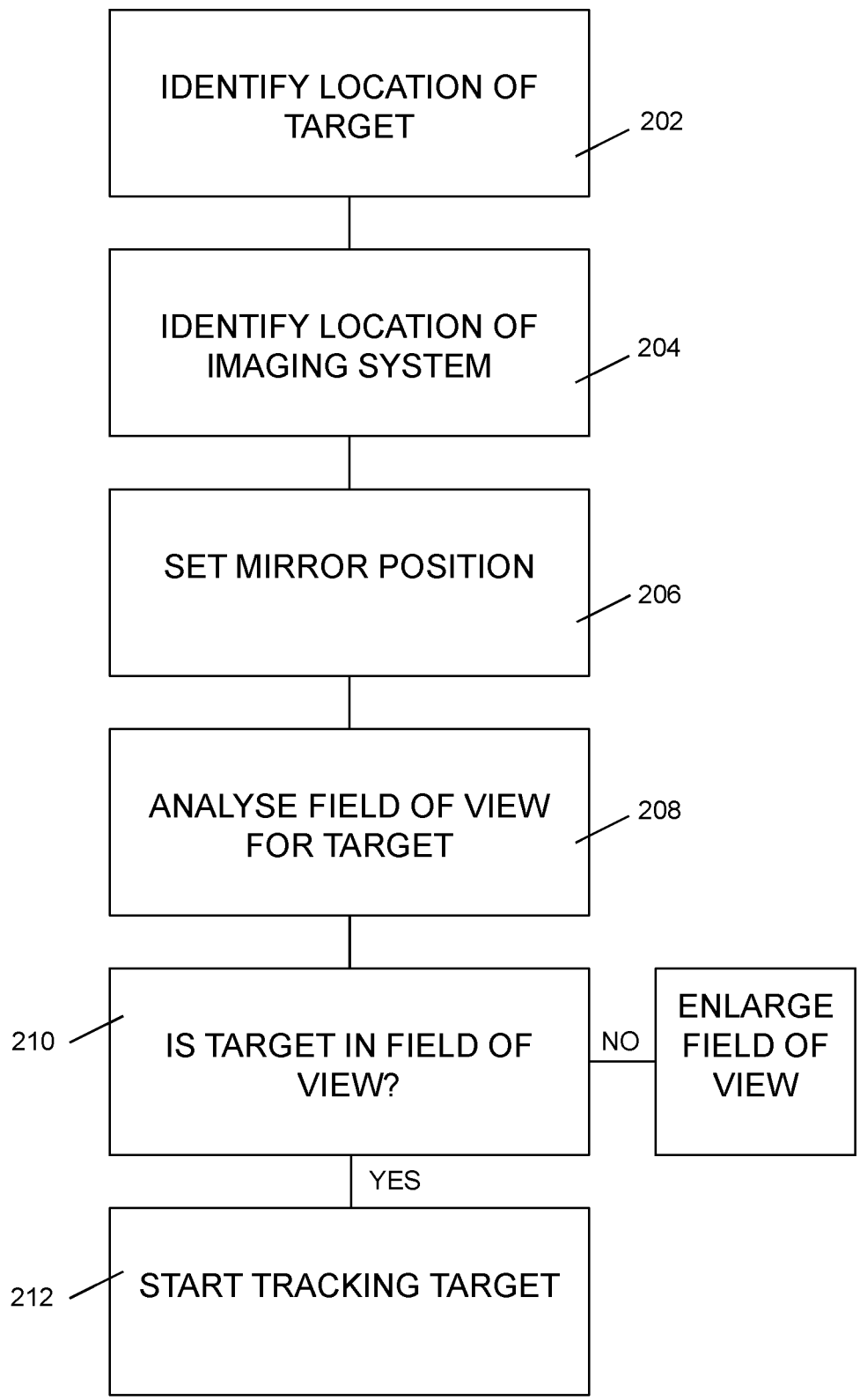
FIG. 2 is a flow chart illustrating the steps taken to position and activate an embodiment.
Figure 3:
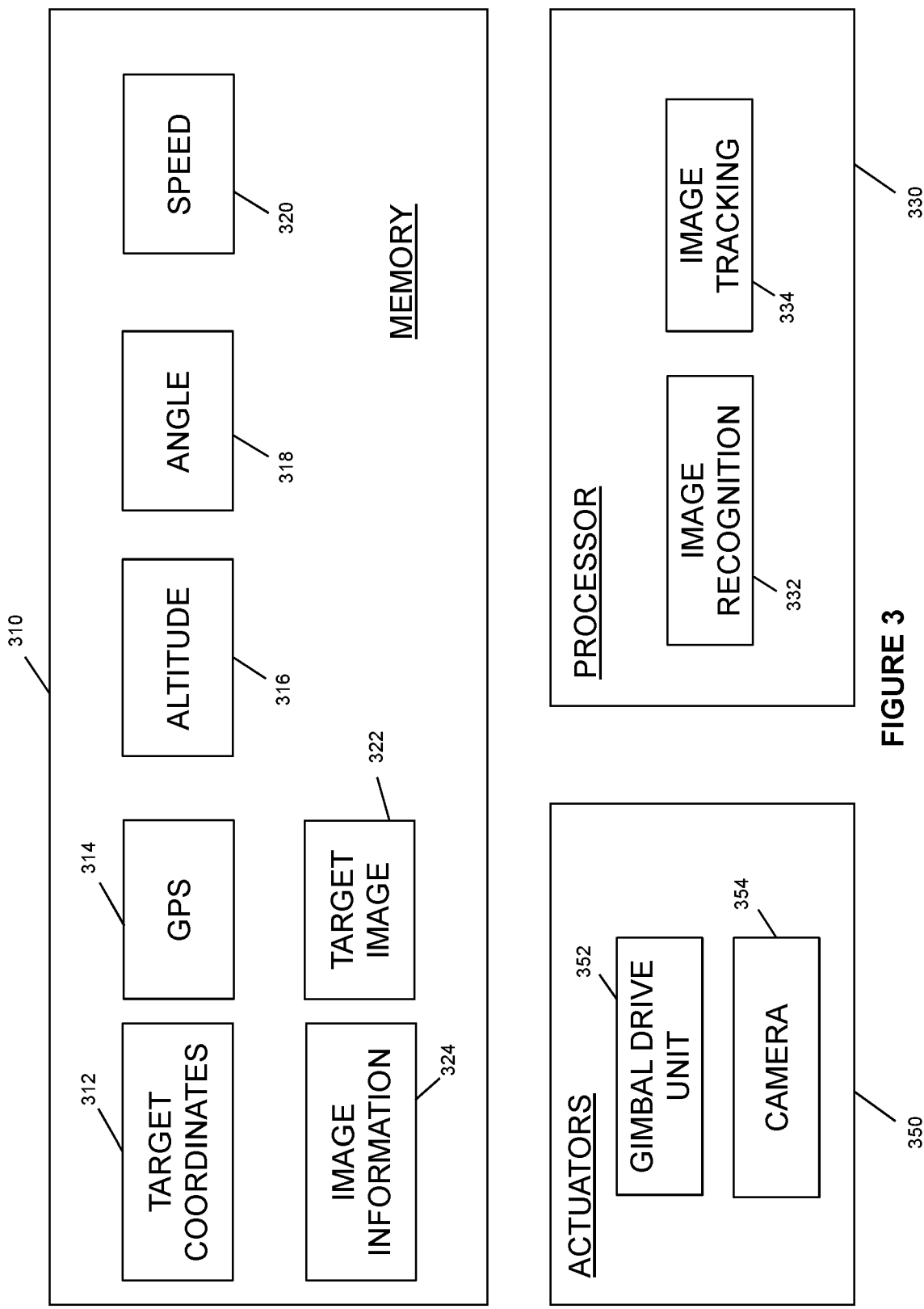
FIG. 3 illustrates the hardware components in an embodiment.

The process for calculating and setting the position of the mirror and triggering the camera is now discussed with respect to FIGS. 2 and 3.

In embodiments the system controls the angle of mirror and the parameters and timing of the camera based on the relative positions of the imaging system and the target. The imaging system includes memory 310 which stores the coordinates of the target for imaging 312. In the example of a system used for imaging a series of power poles within an electricity network, the memory stores the geographical coordinates of power poles. The memory also stores image recognition information 322 for the target to assist with image recognition and tracking. In the example below the memory stores images of the power poles to be used in image recognition.

The memory also stores data related to the position of the imaging system. In an imaging system positioned within an aircraft, the data for the position of the imaging system is determined by aircraft data including the geographical position of the aircraft 314, typically GPS coordinates, the altitude of the aircraft 316, the angle of the aircraft 318, typically in terms of its pitch and roll, and the speed of the aircraft 320. Memory 310 receives this information from sensors positioned on the aircraft. For example the aircraft includes an altimeter to measure the altitude of the aircraft, a GPS system to calculate the location of the aircraft, at least one attitude sensor, for example a gyroscope based sensor, to determine pitch, roll and yaw of the aircraft. Since the imaging system is attached to the aircraft the aircraft data directly corresponds to data for the imaging system. In embodiments, sensor readings are directed to the memory and are stored in memory 310. These data may be stored periodically.

Imaging system includes a processor 330 for calculating the required orientation of the mirror in order to capture an image of the target object. The required position of the mirror is provided to gimbal drive unit 352. Gimbal drive unit 352 orientates the mirror to the required angle. A control unit may control the gimbal drive unit.

Processor 330 also calculates the required camera parameters including timing for capturing the image and focal length. This data is provided to camera 354. The system includes a gimbal drive unit 352 and camera 354.

When activated, the processor retrieves the coordinates of the target from memory 312 at 202.

The required angle of the mirror is determined by the processor retrieving the location of the aircraft and other aircraft data regarding the orientation and movement of the aircraft from memory 204, including location, altitude, pitch, yaw and roll at 204. At 206 the processor uses the altitude of the aircraft with respect to the target, the difference in GPS coordinates of the aircraft with respect to the target along with other aircraft data including pitch, yaw and roll to calculate the angle of the mirror required to capture an image of the target from the camera system. The processor drives the gimbal drive unit to 352 to correctly position the mirror to capture an image of the target 206.

At 208 the image from camera is analysed using image recognition module 332. Image recognition module 332 retrieves target image information from memory 322. At 208 the system searches the image to identify the target. If the target is identified within the image at 210 the processor tracks the image using image tracking module 334 at 212 and controls the gimbal drive unit to move the mirror to maintain the position of the target within the image from the camera. Image tracking module identifies the position of the image of the target within the camera image. The processor uses the positional information to control the gimbal drive unit to move the position of the mirror to maintain the image of the target within the camera image. In this way the position of the mirror is controlled to track the image.

The processor also monitors the change in distance to the target, as the aircraft moves by monitoring the change in aircraft data. In an example embodiment, the distance to the target can be calculated by comparing geographical location coordinates, for example GPS coordinates, of the aircraft and the target to identify the horizontal distance between the aircraft and the target, and also by calculating the vertical distance between the target and the aircraft using the altitude data of the aircraft. Using these distances the absolute direct distance between the aircraft and the target can be calculated. Factors including the position of the imaging system on the aircraft and the height of the target are also accounted for in these measurements to increase accuracy. The processor calculates the required camera parameters, including focal length, to maintain focus on the target within the image.

The timing for taking photographs of the image is based on criteria set in the image capture file 324 within memory 310. In embodiments, the image is captured when there is a specific predefined distance between the image system and the target. Further embodiments include different criteria for image capture, for example, the camera may capture images at regular time intervals.

In preferred embodiments the system actively tracks the target throughout the image monitoring and capture process. In embodiments the mirror continues to move during exposure to maintain focus on the target.

First Exemplary Embodiment

FIGS. 4, 5, 6 and 7 illustrate an embodiment of an imaging system 200 installed in an aircraft for capturing images of power poles from an altitude of around 500 m.

The imaging system for capturing images of power poles within a power network, the memory 310 includes a database of the geographical locations of power poles within the electricity network. The database may include the locations of all poles in the network or may be entered with the location of power poles of interest before an imaging project. The database includes the locations of the poles, generally in terms of their GPS coordinates, and may also include further information about the poles, for example the height of the power pole.

Figure 4:
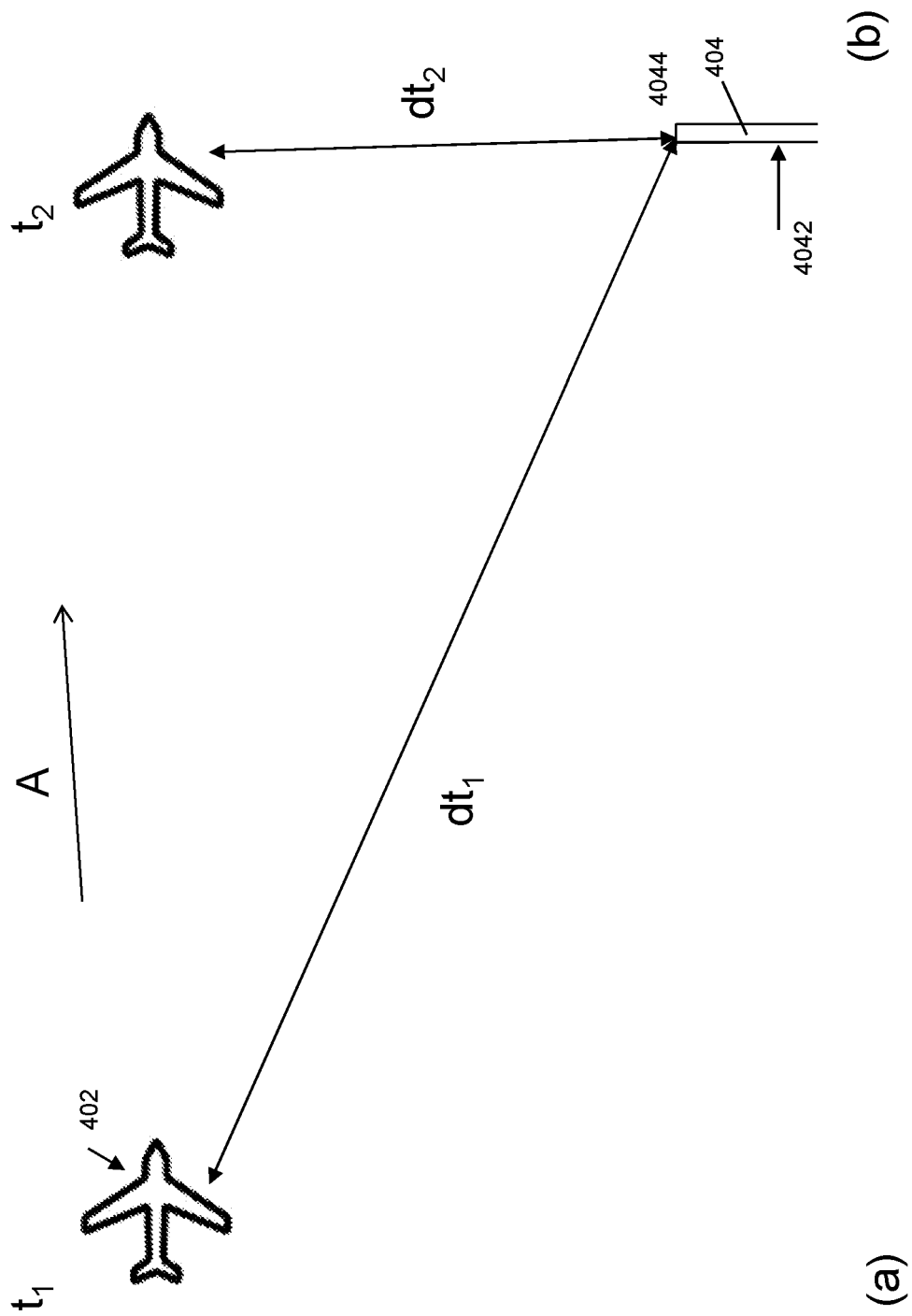
FIG. 4 is an illustration of an aircraft including imaging systems.
Figure 5:
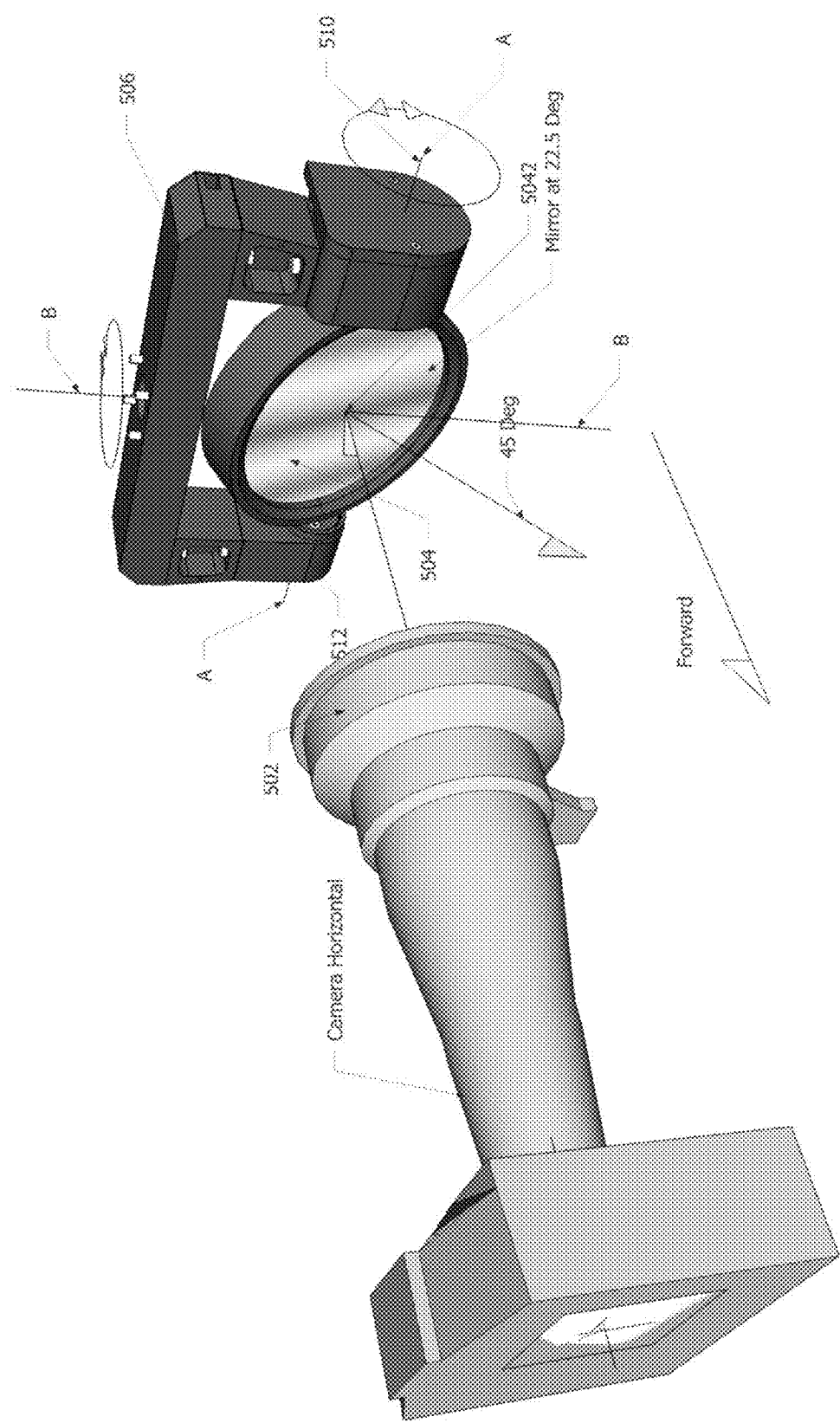
FIG. 5 is an illustration of an imaging system in accordance with an embodiment of the invention.
Figure 6:
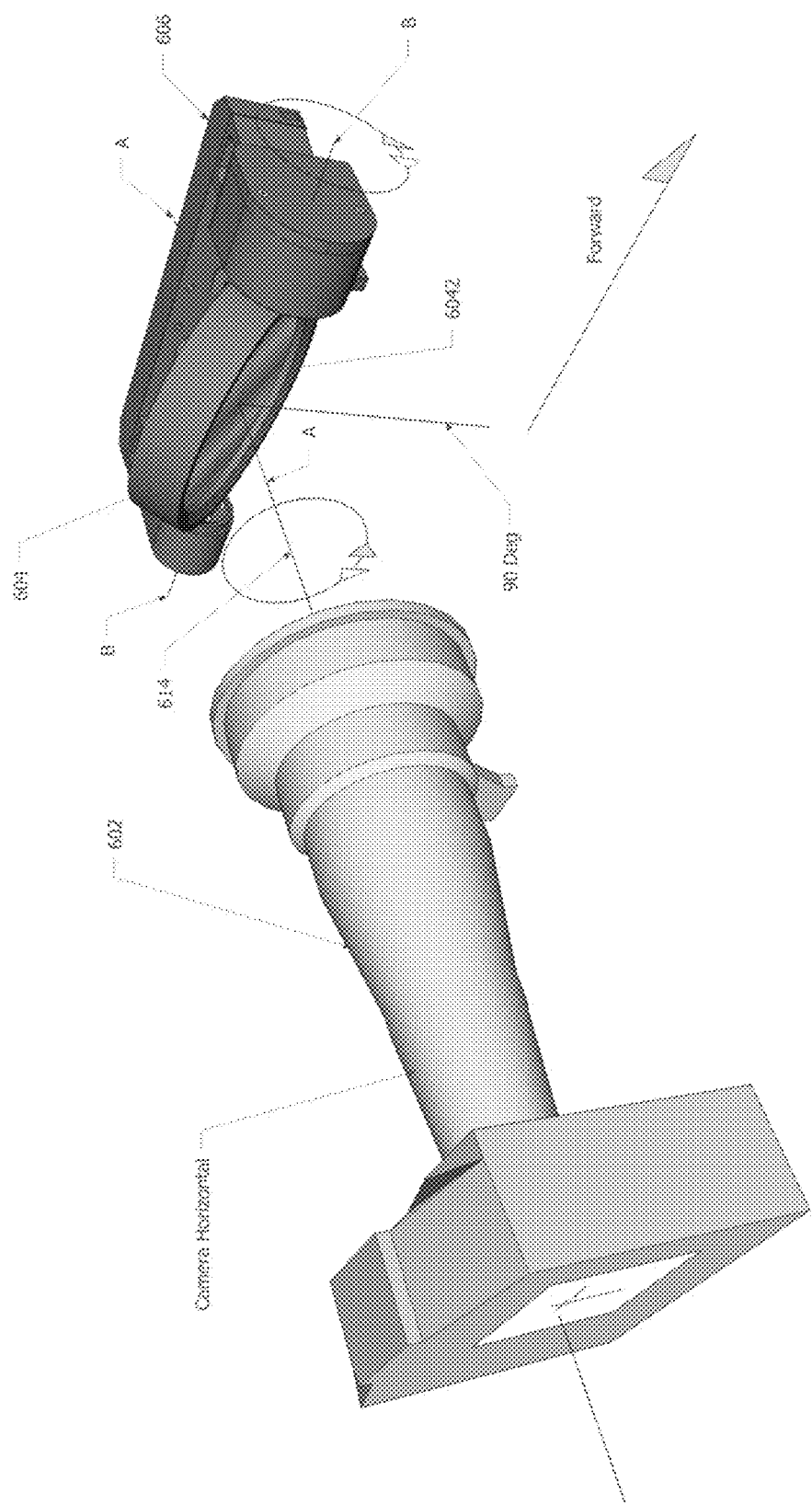
FIG. 6 is an illustration of an imaging system in accordance with an embodiment of the invention.
Figure 7:
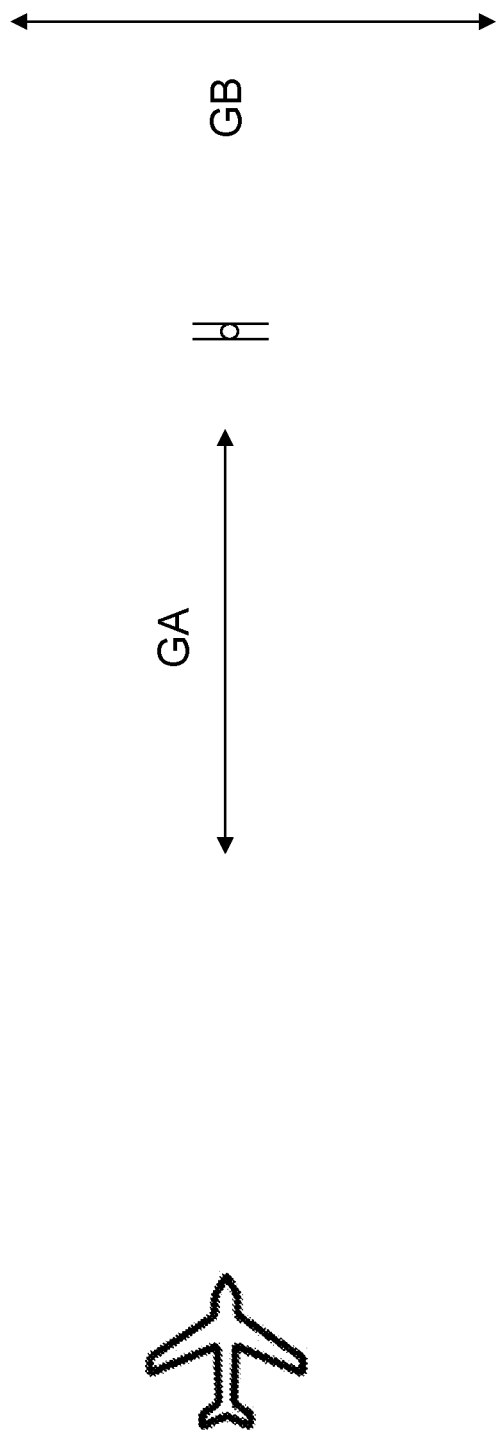
FIG. 7 is an illustration of the field of view of imaging systems from an aircraft.

FIG. 4 shows aircraft 402 approaching and flying above power pole 404. In the example, the imaging system obtains a front elevated view of the top of the power pole (at the position shown in FIG. 4(*a*)) and a top view of the power pole (NADIR angle) at the position shown in FIG. 4(*b*). The images are captured by two separate imaging systems positioned on aircraft 402 as shown in FIGS. 5 and 6. Separate imaging systems are used to obtain fine angular control over specific angle ranges.

FIGS. 5 and 6 are simplified to show only camera 502, mirror 504 and gimbal system 506. The camera system of FIG. 5 is configured to capture the front elevated image of the pole. The camera is pointed rearward in the aircraft with mirror 504 directing the field of view in a forward direction. Mirror 504 is adjustable along two axis of rotation. Axis AA provides a first rotational axis through mirror 504. Mirror 504 is pivoted to gimbal system 506 via pivots 510, 512 to provide rotation of mirror 504 about axis AA. Rotation about axis AA changes the depth of the field of image from the aircraft along the line GA as shown FIG. 7. Gimbal system 506 is also arranged to rotate mirror 504 about axis BB. Rotation about axis BB changes the lateral position of the field of image with respect to the aircraft along line GB in FIG. 7. At zero rotation about axis BB the mirror is angled directly along the path of the aircraft. As the mirror is rotated from the centre position the field of image is repositioned to the left or right side of the aircraft.

Axes AA and BB intersect on the front surface of mirror 504 at point 5042. Gimbal system 506 and camera 502 are arranged such that the optical axis 514 of camera 502 is directed onto point 5042. As discussed previously with respect to FIG. 1, the intersection of optical axis 514 with centre point of rotation 5042 maintains a constant distance between camera 502 and reflection point 5042 regardless of the angle of the mirror with respect to the camera.

For the camera system shown in FIG. 5, the preferred imaging angle from the aircraft is around 45 degrees downward. This angle provides a view of the front and top of the pole in the region in which degradation of the pole often occurs. The gimbal system 506 in the imaging system of FIG. 5 is configured to provide very fine angular control of mirror 504 504 in the angular range of angle of incidence of around 22.5 degrees in order that the mirror can be positioned with sufficient angular accuracy to capture an image of the target within the field of view of the camera after reflection from mirror 504.

The camera system of FIG. 6 is configured to capture the top view of power pole 404. The camera is directed across the aircraft with mirror 604 directing the field of view in a generally downward direction. Mirror 604 is adjustable along two axis of rotation. Axis AA provides a rotational axis through mirror 604. Rotation about axis AA changes the depth of the field of image along the direction of motion of the aircraft, as shown as GA in FIG. 7. Gimbal system 606 also provides rotation of mirror 604 about axis BB. Rotation about axis BB changes the lateral position of the field of image with respect to the aircraft along line GB in FIG. 7. At zero rotation about axis BB the mirror is angled directly along the path of the aircraft. As the mirror is rotated from the centre position the field of image is repositioned to the left or right side of the aircraft.

Axes AA and BB intersect on the front surface of mirror 604 at point 6042 in FIG. 6. Gimbal system 606 and camera 602 are arranged such that the optical axis 614 of camera 602 is directed onto point 6042. Again, the intersection of optical axis 614 with centre point of rotation 6042 maintains a constant distance between camera 602 and reflection point 6042 regardless of the angle of the mirror with respect to the camera.

For the camera system shown in FIG. 6, the preferred imaging angle is around 90 degrees to provide an image directly below the aircraft. This angle provides a top view of the pole. The Gimbal system 606 in the imaging system of FIG. 6 is configured to provide very fine angular control of mirror 604 in an angle of incidence of around 45 degrees in order to capture images below the aircraft.

Initial Discussion of Positioning Mirror to Capture Target

FIGS. 5 and 6 illustrate embodiment of the imaging system integrated into an aircraft for imaging a power pole of an electricity network. FIG. 4 shows aircraft 402 positioned with respect to power pole 404. FIG. 4*a* shows the aircraft 402 at time T1 moving towards power pole 404. FIG. 4*b* illustrates the position of aircraft 402 with respect to pole 404 at a later time T2 when the aircraft is positioned above power pole 404. FIGS. 5 and 6 illustrate the configuration of the imaging system positioned within aircraft 402 at times T1 and T2. As discussed above, FIGS. 5 and 6 are simplified illustrations of the imaging system showing only camera 502 602 and mirror 504 604 and gimbal 506 606.

At T1 aircraft 402 is approaching power pole 404 to capture a front elevated image of power pole 404. Imaging system is configured to maintain power pole 404 within the field of view of the imaging system. As discussed above, the system is programmed with the geographical coordinates of power pole 404. When activated, the image system retrieves the current coordinates of the aircraft other data mentioned above and determines the angle required for the mirror in order to position the pole within the field of view of the camera. The mirror is positioned and the image from the camera is analysed using the image recognition module to identify the power pole within the image. If the pole is identified within the image the image tracking module positions the mirror to position the image of the power pole within the image. The image tracking module controls the mirror to maintain the pole in the field of view. The tracking module accounts for change in location, altitude, angle, roll, yaw and pitch of the aircraft and corresponding movement of the pole within the field of view by tracking the power pole in the image.

In the embodiment the system is programmed to capture the image at a distance of 700 m from the pole. The system monitors the position of the aircraft and captures an image when the aircraft is at 700 m from the pole.

At time T2 aircraft 302 is positioned vertically above power pole 304. The imaging system of FIG. 6 tracks the position of the pole from an overhead position. The system identifies when the geographical coordinates of the aircraft are above the power pole, based on GPS coordinates of the aircraft and the power pole and trigger the image to be captured.

As the distance between the imaging system on the aircraft and the power pole changes as the position of the aircraft changes, the focal point of camera 402 is changed in order maintain focus on the power pole and provide high resolution and focused images of the power pole.

In further embodiments additional imaging systems may be arranged in a single aircraft or vehicle in order to capture images of target objects from different angles at different times.

In the embodiment described above, the imaging system tracks the target using geographical coordinates, aircraft data and image recognition modules. In further embodiments, the image system is arranged to capture the image at a particular position along its path based on coordinates rather than tracking distance from the target. In such embodiments the flight path of the aircraft is pre-programmed and the imaging systems are configured to capture images at particular positions on the flight path. In such cases the mirror is pre-positioned to capture the image from the predetermined coordinates.

It will be clear to those skilled in the art that multiple imaging systems can be positioned on a single aircraft or vehicle. Those systems can be configured independently to capture images of the same or different target objects. For example, in an aircraft system separate cameras could be positioned to capture images in a forward direction with respect to the aircraft, in a rearward direction with respect to the aircraft, in a downward position with respect to the direction of the aircraft or in a sidewards direction with respect to the motion of the aircraft. The separate systems can be directed to the same target object or different target objects.

When selecting shutter speed for the camera during an image the speed of the imaging system will be taken into account. It will be apparent to those skilled in the art that the longer the shutter speed the greater the blurring which would occur in an image taken from a moving camera. As the speed of the aircraft increases, typically, shorter shutter speeds may be appropriate to reduce the effects of blurring.

In further embodiments video images may be recorded to capture images of the target rather than static images.

In embodiments of the invention, imaging details of the system are recorded against each image including the height of the imaging system (defined by the altitude of the aircraft at the time the image was captured), the speed and mirror angle. The data also includes information about the height of the pole and distance to the pole as well as camera parameters including the shutter speed and the lidar swath, describing the area of ground covered by the image. Role pitch and yaw measurements are also included to describe the position of the aircraft at the time the image was captured.

It will be clear to those skilled in the art that embodiments of the invention provide a system which is able to capture images of target objects from a moving system. Challenges of providing higher resolution images at long distances while moving at speed are addressed by using an innovative camera and mirror configuration which is able to be controlled accurately and quickly using electronics based on movement of the engine system with respect to the target object.

It will be clear to those skilled in the art that the applications for embodiments of the present invention extend beyond the imaging of grounded target objects from aerial view point but can also be used to image moving objects or static objects from other moving vehicles.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

APPENDIX

System Parameters and Performance of Different Systems

For any given system there are a number of parameters which are either fixed, for example height of power pole, or are variable, for example speed. The following tables show the effect of various input parameters of Table 1 against the image properties for different lenses of imaging systems.

TABLE 1

| Inputs | |
|---|---|
| Height (AGL) | 500 m |
| Speed | 167 kph |
| Shot Angle | 45 deg |
| Pole Height | 12 m |
| Pole Dist | 50 m |
| Shutter Speed | 8000 1/x sec |
| Lidar swath | 400 m |
| Max Roll +/− | 10 deg |
| Max Pitch +/− | 10 deg |
| Max Yaw +/− | 25 deg |

TABLE 2

| Assumptions | | | | | |
|---|---|---|---|---|---|
| | | | Depth of field at F5.6 | | |
| Full Size Sensor −> 1 x | | | 30 Deg - 1000 m actual | 45 Deg - 707 m actual | 60 Deg - 577 m actual |
| Lense | Horizontal Angle | Vertical Angle | distance to Pole | distance to Pole | distance to Pole |
| 200 | 10.3 | 6.9 | infinite | infinite | infinite |
| 400 | 5.2 | 3.4 | infinite | 2333 | 1102 |
| 600 | 3.4 | 2.3 | 1192 | 522 | 334 |
| 800 | 2.6 | 1.7 | 563 | 271 | 178 |
| 1000 | 2.1 | 1.4 | 345 | 170 | 112 |
| 1200 | 1.7 | 1.1 | 236 | 117 | 78 |
| FLIR HDC | 1.4 | 0.8 | | | |

TABLE 3

Field of view in horizonal plane (i.e. on the ground)

| Lens | Vertical Angle Of View (deg) | Ground distance to Near edge (m) | Ground distance to Mid point (m) | Ground distance to Far edge (m) | Forward Field (m) | Less Pole Height Projected (m) | Reduced forward field (m) | Time in Frame (s) |
|---|---|---|---|---|---|---|---|---|
| 200 | 6.9 | 443.14 | 500.00 | 564.15 | 121.01 | 13.54 | 107.47 | 2.32 |
| 400 | 3.4 | 471.18 | 500.00 | 530.59 | 59.41 | 12.73 | 46.68 | 1.01 |
| 600 | 2.3 | 480.32 | 500.00 | 520.49 | 40.16 | 12.49 | 27.67 | 0.60 |
| 800 | 1.7 | 485.38 | 500.00 | 515.06 | 29.68 | 12.36 | 17.32 | 0.37 |
| 1000 | 1.4 | 487.93 | 500.00 | 512.37 | 24.44 | 12.30 | 12.14 | 0.26 |
| 1200 | 1.1 | 490.49 | 500.00 | 509.69 | 19.20 | 12.23 | 6.97 | 0.15 |
| FLIR HDC | 0.8 | 493.07 | 500.00 | 507.03 | 13.96 | 12.17 | 1.79 | 0.04 |

TABLE 4

Field of view in vertical plane

| Lens | Actual distance to midpoint (m) | Width of frame @ Midpoint (m) | Height of Frame (m) |
|---|---|---|---|
| 200 | 707.11 | 127.46 | 113.72 |
| 400 | 707.11 | 64.22 | 57.65 |
| 600 | 707.11 | 41.97 | 39.36 |
| 800 | 707.11 | 32.09 | 29.24 |
| 1000 | 707.11 | 25.92 | 24.14 |
| 1200 | 707.11 | 20.98 | 19.02 |
| FLIR HDC | 707.11 | 17.28 | 13.87 |

TABLE 5

Pixel Resolution

| Lens | 1d Horizontal mm/pixel | 1d Vertical mm/pixel | 5d Horizontal mm/pixel | 5d Vertical mm/pixel | D180 Horizontal mm/pixel | D180 Vertical mm/pixel | A99v Horizontal mm/pixel | A99v Vertical mm/pixel | IXA 180 Horizontal mm/pixel | IXA 180 Vertical mm/pixel | FLIR HDC Horizontal mm/pixel | FLIR HDC Vertical mm/pixel |
|---|---|---|---|---|---|---|---|---|---|---|---|---|
| 200 | 24.6 | 32.9 | 22.1 | 29.6 | 17.3 | 23.2 | 21.2 | 28.4 | 12.3 | 14.7 | | |
| 400 | 12.4 | 16.7 | 11.1 | 15.0 | 8.7 | 11.7 | 10.7 | 14.4 | 6.2 | 7.4 | | |
| 600 | 8.1 | 11.4 | 7.3 | 10.2 | 5.7 | 8.0 | 7.0 | 9.8 | 4.1 | 5.1 | | |
| 800 | 6.2 | 8.5 | 5.6 | 7.6 | 4.4 | 6.0 | 5.3 | 7.3 | 3.1 | 3.8 | | |
| 1000 | 5.0 | 7.0 | 4.5 | 6.3 | 3.5 | 4.9 | 4.3 | 6.0 | 2.5 | 3.1 | | |
| 1200 | 4.0 | 5.5 | 3.6 | 5.0 | 2.9 | 3.9 | 3.5 | 4.8 | 2.0 | 2.5 | | |
| FLIR HDC | | | | | | | | | | | 13.5 | 19.3 |

TABLE 6

Shot Distances

| | Direction Forward | Down | Back | Units |
|---|---|---|---|---|
| Distance to Subject | 500 | 0 | 500 | m |
| Distance travelled during shot | 0.005798611 | 0.0057986 | 0.0057986 | m |
| Angle Change during shot | 0.000332238 | 0.0006645 | 0.0003322 | deg |
| Rotation Rate *This will be Half actual if camera is axialy mounted | 2.657902962 | 5.3157751 | 2.657903 | deg/sec |
| | 0.442983827 | 0.8859625 | 0.4429838 | rpm |
| | 46.38915788 | 92.777778 | 46.389158 | urad/sec |

What is claimed is:

1. An imaging system for capturing photographic images of a target object, comprising:
   a first mirror arranged to rotate about at least one axis;
   a control unit configured to control the position of the first mirror;
   a first camera having a field of view and configured to acquire a sequence of images and at least one high-resolution photograph;
   a memory storing a database including predefined images of target objects;
   an image recognition and tracking system, configured to identify a target object in the sequence of images using the predefined images of target objects from the database, and configured to actively track the target object in the sequence of images and to generate positional information associated with positions of the target object within the sequence of images; and
   wherein the control unit is configured to
      dynamically adjust the angle of the first mirror based on the generated positional information during acquiring of the sequence of images, in order to maintain a reflection of the target object in the field of view of the first camera while the first camera and the target object move relative to one another, and to
      instruct the first camera to capture at least one high resolution photograph of the target object in response to the first camera being at a determined distance from the target object
   wherein the first camera is mounted in or on an aircraft, wherein the field of view of the first camera is pointed in a rearward direction of the aircraft, and the first mirror reflects the field of view in a forward direction of the aircraft; the first mirror being rotatable about two axes, such that rotation of the first mirror about a first axis changes a tilt angle of a reflected field of view relative to the forward direction of the aircraft, and such that rotation of the first mirror about a second axis changes a panning angle of the reflected field of view relative to the forward direction of the aircraft; and a second camera having a further field of view pointed sidewards with respect to the aircraft, and being configured to acquire a sequence of further images and at least one further high-resolution photograph, and a second mirror, reflecting the further field of view in a downwards direction of the aircraft, and being rotatable by the control unit about two further axes, such that rotation of the second mirror about a first further axis changes a further tilt angle of a reflected further field of view relative to the forward direction of the aircraft, and that rotation of the second mirror about a second further axis changes a further roll angle of the reflected further field of view relative to the forward direction of the aircraft.

2. The imaging system according to claim 1 further comprising a gimbal, the gimbal supporting the first mirror.

3. The imaging system according to claim 1 wherein the optical axis of the first camera is directed at the centre of rotation of the first mirror.

4. The imaging system according to claim 1 wherein the first mirror is a first surface mirror.

5. The imaging system according to claim 1, wherein the control unit is configured
to position the first mirror and instruct the camera to acquire a front elevated high-resolution photograph of the target object at a first instance of time,
to control the angle of the second first mirror in order to maintain a reflection of the target object in the further field of view of the second camera in dependence on the positional information from the image recognition and tracking system,
and wherein the control unit is configured to instruct the second camera to acquire a vertically overhead high-resolution photograph at a second instance of time following the first instance of time.

6. A method for capturing a high-resolution photograph of a target object from a camera using an imaging system including a first mirror arranged to rotate about at least one axis, a control unit configured to adjust the position of the first mirror, a camera having a field of view and being configured to acquire a sequence of images and the at least one high-resolution photograph, a memory unit storing a database with predefined images of target objects, and an image recognition and tracking system, a second mirror, and a second camera having a further field of view and being configured to acquire a sequence of further images and at least one further high-resolution photograph, and the imaging system is mounted in or on an aircraft, the method comprising:
acquiring, with the camera, the sequence of images;
identifying, with the image recognition and tracking system, the target object in the sequence of images using the predefined images of target objects from the database;
actively tracking, with the image recognition and tracking system, the target object in the sequence of images;
generating, with the image recognition and tracking system, positional information associated with positions of the target object within the sequence of images;
adjusting, with the control unit, the angle of the first mirror based on the positional information while acquiring the sequence of images, in order to maintain a reflection of the target object in the field of view of the camera while the imaging system and target object move relative to each other;
instructing the camera to capture the at least one high-resolution photograph of the target object in response to an observation by the imaging system that the imaging system is at a determined distance from the target object,
storing the high-resolution photograph of the target object in the memory unit, pointing the field of view of the camera in a rearward direction of the aircraft;
initially reflecting, with the first mirror, the field of view in a forward direction of the aircraft;
during acquiring the sequence of images, identifying and actively tracking the target object in the sequence of images, and generating the positional information:
adjusting a tilt angle of a reflected field of view relative to the forward direction of the aircraft, by rotating the first mirror about a first axis using the control unit, and
adjusting a panning angle of the reflected field of view relative to the forward direction of the aircraft, by rotating the first mirror about a second axis using the control unit;
pointing the further field of view of the second camera sidewards with respect to the aircraft;
initially reflecting, with the second mirror, the further field of view in a downwards direction of the aircraft;
acquiring, with the second camera, the sequence of further images;
identifying, with the image recognition and tracking system, the target object in the sequence of further images using the predefined images of target objects from the database;
actively tracking, with the image recognition and tracking system, the target object in the sequence of further images;
generating, with the image recognition and tracking system, further positional information associated with positions of the target object within the sequence of further images;
adjusting a further tilt angle of a reflected further field of view relative to the forward direction of the aircraft, by rotating, with the control unit, the second mirror about a first further axis, and
adjusting a further roll angle of the reflected further field of view with respect to the forward direction of the aircraft, by rotating, with the control unit, the second mirror about a second further axis using the control unit.

7. The method according to claim 6, further comprising:
maintaining an optical axis of the first camera directed onto the centre of rotation of the mirror when adjusting the angle of the first mirror.

8. The method according to claim 6, wherein the imaging system further comprises a gimbal supporting the mirror and a gimbal drive unit for actuating the gimbal, the method further comprising:

controlling, with the control unit, the gimbal drive unit in order to maintain the target object in the field of view of the first camera.

9. The method according to claim 6, further comprising operating the control unit
- to instruct the first camera to acquire the sequence of images, while adjusting the angle of the first mirror based on the positional information;
- to instruct the first camera to acquire a front elevated high-resolution photograph of the target, when the imaging system is at the determined distance from the target object;
- to adjust the angle of the second mirror to maintain a reflection of the target object in the further field of view of the second camera based on the further positional information from the image recognition and tracking system, while the second camera acquires the sequence of further images, and
- to instruct the second camera to acquire a vertically overhead high-resolution photograph, when the imaging system is at an overhead position relative to the target object.

\* \* \* \* \*